US010009353B2

(12) United States Patent
Dziadosz et al.

(10) Patent No.: US 10,009,353 B2
(45) Date of Patent: *Jun. 26, 2018

(54) SYSTEM AND METHOD TO AGGREGATE CONTROL OF MULTIPLE DEVICES VIA MULTICAST MESSAGES AND AUTOMATIC SET UP OF CONNECTIONS

(71) Applicant: Honeywell International Inc., Morristown, NJ (US)

(72) Inventors: John A. Dziadosz, Burlington, WI (US); Shiyuan Qi, New Berlin, WI (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 193 days.

This patent is subject to a terminal disclaimer.

(21) Appl. No.: 14/981,389

(22) Filed: Dec. 28, 2015

(65) Prior Publication Data

US 2016/0226885 A1  Aug. 4, 2016

Related U.S. Application Data

(63) Continuation of application No. 13/761,871, filed on Feb. 7, 2013, now Pat. No. 9,230,373.

(51) Int. Cl.
*G08B 21/00* (2006.01)
*H04L 29/06* (2006.01)
(Continued)

(52) U.S. Cl.
CPC ........ *H04L 63/104* (2013.01); *G07C 9/00007* (2013.01); *G07C 9/00103* (2013.01);
(Continued)

(58) Field of Classification Search
CPC ............ G07C 9/00007; H04L 63/0428; H04L 63/104; H04L 63/168
(Continued)

(56) References Cited

U.S. PATENT DOCUMENTS 5,909,183 A  6/1999 Borgstahl et al.
2002/0035681 A1  3/2002 Maturana et al.
(Continued)

FOREIGN PATENT DOCUMENTS

CN  101127595 A  2/2008
WO  02/11390 A2  2/2002

OTHER PUBLICATIONS

English-language translation of Abstract for CN patent publication 101127595, dated Feb. 20, 2008.
(Continued)

*Primary Examiner* — Mark Rushing
(74) *Attorney, Agent, or Firm* — Husch Blackwell LLP

(57) ABSTRACT

A method and apparatus are provided to aggregate control of multiple devices. In some methods, a downstream controller can advertise a service group of the downstream controller, can receive a connection request message from a gateway controller that is part of the service group, and responsive to the connection request message, can transmit a connection accept message to the gateway controller to set up a connection channel between the downstream controller and the gateway controller. In some methods, the gateway controller can receive an advertisement message from the downstream controller, can transmit the connection request message to the downstream controller responsive to the advertisement message and when the gateway controller is part of the service group, and can receive the connection accept message from the downstream controller to set up the connection channel between the gateway controller and the downstream controller.

19 Claims, 2 Drawing Sheets

(51) Int. Cl.
*G07C 9/00* (2006.01)
*H04L 29/08* (2006.01)
*G08B 13/196* (2006.01)

(52) U.S. Cl.
CPC .... *G08B 13/19654* (2013.01); *H04L 63/0428* (2013.01); *H04L 63/168* (2013.01); *H04L 67/16* (2013.01); *H04L 67/12* (2013.01)

(58) Field of Classification Search
USPC .......................................................... 340/5.2
See application file for complete search history.

(56) References Cited

U.S. PATENT DOCUMENTS

| | | |
|---|---|---|
| 2003/0018891 A1 | 1/2003 | Hall et al. |
| 2005/0242921 A1 | 11/2005 | Zimmerman et al. |
| 2009/0024853 A1 | 1/2009 | Yeap et al. |
| 2009/0070477 A1 | 3/2009 | Baum et al. |
| 2012/0066707 A1* | 3/2012 | Poder ................... G08B 25/008 725/14 |
| 2012/0151212 A1* | 6/2012 | Chowdhury .......... H04L 63/061 713/168 |
| 2013/0091210 A1 | 4/2013 | Rajakarunanayake et al. |

OTHER PUBLICATIONS

First Office Action and Search Report for corresponding CN patent application 201410043835.5, dated Jun. 2, 2017.
English-language translation of First Office Action and Search Report for corresponding CN patent application 201410043835.5, dated Jun. 2, 2017.
European examination report from corresponding EP patent application 14152345.6, dated Sep. 16, 2016.
European search report from corresponding EP patent application 14152345.6, dated Sep. 6, 2016.
Cheshire M. Krochmal, Apple Inc. S: "DNS-Based Service Directory;draft-cheshire-dnsext-dns-sd-11.txt", DNS-Based Service Discovery; Draft-Cheshire-DNSEXT-DNS-SD-11.txt, Internet Engineering Task Force, IETF; Standworkingdraft, Internet Society (ISOC) 4, Rue Des Falaises CH-1205 Geneva, Switzerland, pp. 1-54, dated Dec. 10, 2011.
Guttman C. Perkins, Sun Microsystems J. Veizades @Home Network M Day Vinca Corporation E: "Service Location Protocol, Version 2; rfc2608.txt", 5. JCT-VC Meeting; 96. MPEG Meeting Mar. 16, 2011-Mar. 23, 2011; Geneva; (Joint Collaborative Team on Video Coding of ISO/IEC JTC1/SC29/WG11 and ITU-T SG.16); URL:http://wftp3.itu.int/av-arch/jctvc-site/, Internet Engineering Task Force, IETF, CH, dated Jun. 1, 1999.
Erik Guttman et al., "On the Wire Autoconfiguration for IP Networking: Enabling Local Communication", IEEE Internet Computing, vol. 5, No. 3, pp. 81-86, dated May 1, 2001.

* cited by examiner

SYSTEM AND METHOD TO AGGREGATE CONTROL OF MULTIPLE DEVICES VIA MULTICAST MESSAGES AND AUTOMATIC SET UP OF CONNECTIONS

CROSS-REFERENCE TO RELATED APPLICATIONS

This application is a continuation of and claims the benefit of the filing date of U.S. application Ser. No. 13/761,871 filed Feb. 7, 2013.

FIELD

The field of the invention relates to security systems and, more particularly, to the control of security devices in security systems.

BACKGROUND

Security systems are generally known. Such systems are typically used to protect secured areas from threats. Threats may include intruders that represent a threat to authorized persons within the secured areas or environmental threats, such as fire or smoke.

Access to the secured areas is usually prevented via the use of fences or walls that surround the secured areas. One or more doors may be provided for access by authorized persons.

A centrally located control panel may be provided that monitors the secured areas. One or more sensors and/or cameras may detect the intruders or the environmental threats within the secured areas. The sensors may include limit switches on the doors to detect the intruders entering the secured areas. Card readers may be provided on the doors to detect entry by authorized persons.

While such systems work well, they are often difficult to set up and administer. In the case of large installations, the number of doors and sensors may number in the hundreds. Because of the large number of doors and sensors, such systems are difficult to configure. Accordingly, a need exits for expedited ways of setting up such security systems.

DETAILED DESCRIPTION OF AN ILLUSTRATED EMBODIMENT

Figure 1:
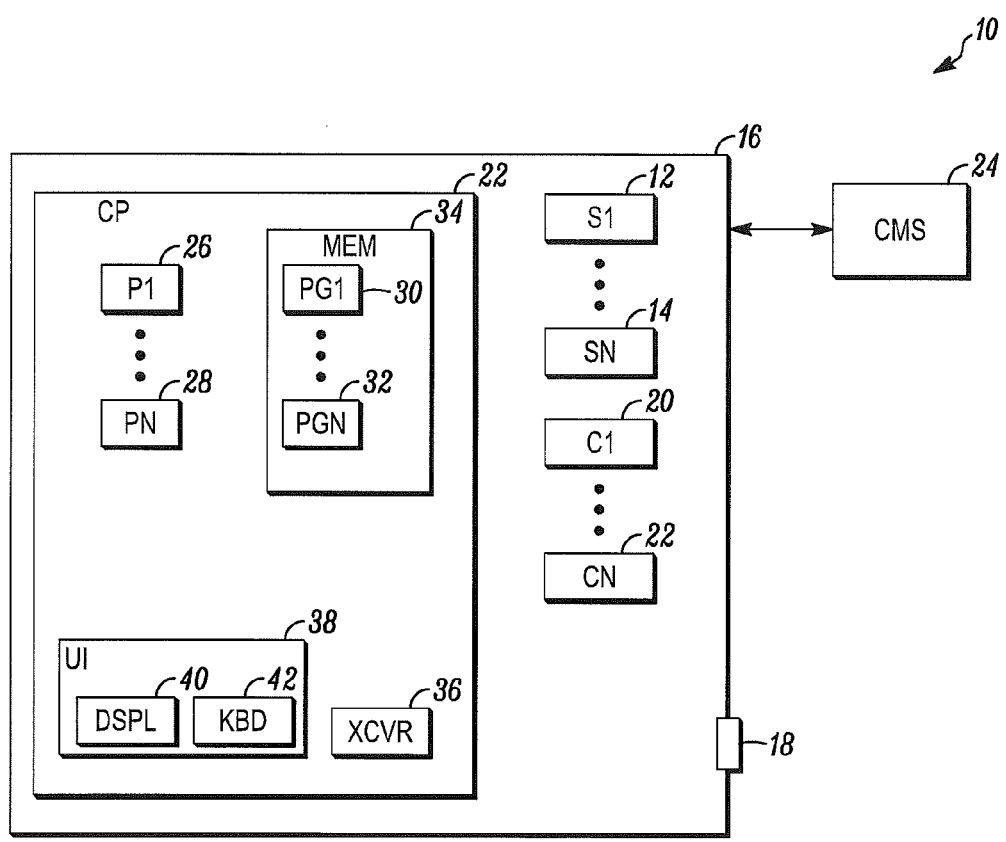
FIG. 1 is a block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof as well as the best mode of practicing the same. No limitation to the specific embodiment illustrated is intended.

FIG. 1 is a block diagram of a security system 10 shown generally in accordance with an illustrated embodiment. Included within the security system may be one or more sensors 12, 14 that detect threats within a secured area 16. The threats may be due to the presence of intruders or due to environmental threats. In the case of intruders, the sensors may include limit switches connected to portals (e.g., doors, windows, etc.) 18 that provide entry into or egress from the secured area 16. Alternatively, the sensors may include card readers and electrically activated locks that provides access to authorized users of the area 16 through the doors 18.

In the case of environmental threats, the sensors may be constructed to detect fires. Other sensors may be constructed to detect natural gas.

Also included within the secured area may be one or more cameras 20, 22. The cameras may be monitored by a security guard or may include a motion detection capability.

Each of the sensors and the cameras may be monitored via a control panel 22. Upon detection of a threat via one of the sensors or cameras, the control panel may send an alarm message to a central monitoring station 24. The central monitoring station may respond by sending help (e.g., the police, fire department, etc.).

Included within the control panel (and each of the sensors and the cameras) may be one or more processor apparatuses (processors) 26, 28 operating under control of one or more computer programs 30, 32 loaded from a non-transitory computer readable medium (memory) 34. As used herein, reference to a step performed by a computer program of the panel is also a reference to the processor that executed that step.

In this regard, an alarm processor of the panel may monitor the sensors and the cameras. Upon detecting the threat, the processor may activate a local audio/visual alarm. The processor may also compose and send the alarm message to the central monitoring station. The message may include an identifier of the security system (e.g., account number, address of the secured area, etc.) and an identifier of the type and location of the sensor or the camera that detected the threat.

The panel and each of the sensors may be joined via a wired or wireless connection. Where a wireless connection is used, the panel and the sensors may also include wireless transceivers 36. The wireless transceivers 36 may be used to set up a wireless connection channel between the control panel and each of the sensors and the cameras.

Under one illustrated embodiment, the connection between the panel and each of the sensors and the cameras may use a Zero Configuration/Multicast DNS type protocol as described by the IETF Zero Configuration Working Group (e.g., www.zeroconf.org). The use of Zero Configuration/Multicast DNS messaging allows the connection to be automatically set up between the panel and each of the sensors and the cameras with very little or no human involvement.

In order to facilitate set up of the connection between the panel and each of the sensors and the cameras, one or more gateways within the panel may exchange a series of messages with one or more downstream processors within (or associated with) each of the sensors and the cameras. A gateway or gateway controller within the panel refers to one or more programmed processors 26, 28 and a transceiver 36 operating together as the gateway. Similarly, the term "downstream processor" or "downstream controller" is used herein to generically refer to a portion of one of the sensors or the cameras, where the portion includes one or more programmed processors 26, 28 and a transceiver 36 within the one of the sensors or the processors.

In this regard, the gateway may be provided with one or more lists of service groups. As used herein, a service group refers to one or more of the sensors and/or the cameras that provide the same or a similar functionality. For example, one of the sensors may include an access controller (including a card reader, an electrically operated lock, associated processors, and a transceiver) that that is included within one particular type of service group. Similarly, one of the cameras may include a motion detector (including a camera, a motion detection processor, and a transceiver) that is included within another service group. As a still further alternative, another of the sensors could include a window or door opening sensor module (including a limit switch, a processor, and a transceiver) that is included within still another service group.

For each of the service groups, the gateway may transmit a multicast message identifying one service group at a time to the sensors and the cameras in order to automatically discover the members of that service group. The multicast message transmitted by the gateway includes at least an identifier of one of the service groups and an authentication certificate.

A downstream controller only responds to the multicast message identifying the service group of which the controller is a member. In this regard, any downstream controller that receives the message responds with an advertisement message advertising a type of service provided by the corresponding sensor or camera. The gateway authenticates the downstream controller and sets up a channel with the downstream controller.

As each downstream controller is discovered, identifying characteristics of the downstream controller are saved in a system map table and a service status table. In the case where the gateway connects with different types of service groups, the identifying characteristics of each of the services group may be saved in a different table associated with that group.

However, occasionally, the connection with the downstream controller may be periodically lost. In order to accommodate this possibility, the gateway controller periodically re-enters a discovery mode (e.g., every 30 seconds) to rediscover each of the sensors and/or the cameras within the secured area that is within range. The gateway may then browse responses to update the system map table.

Figure 2:
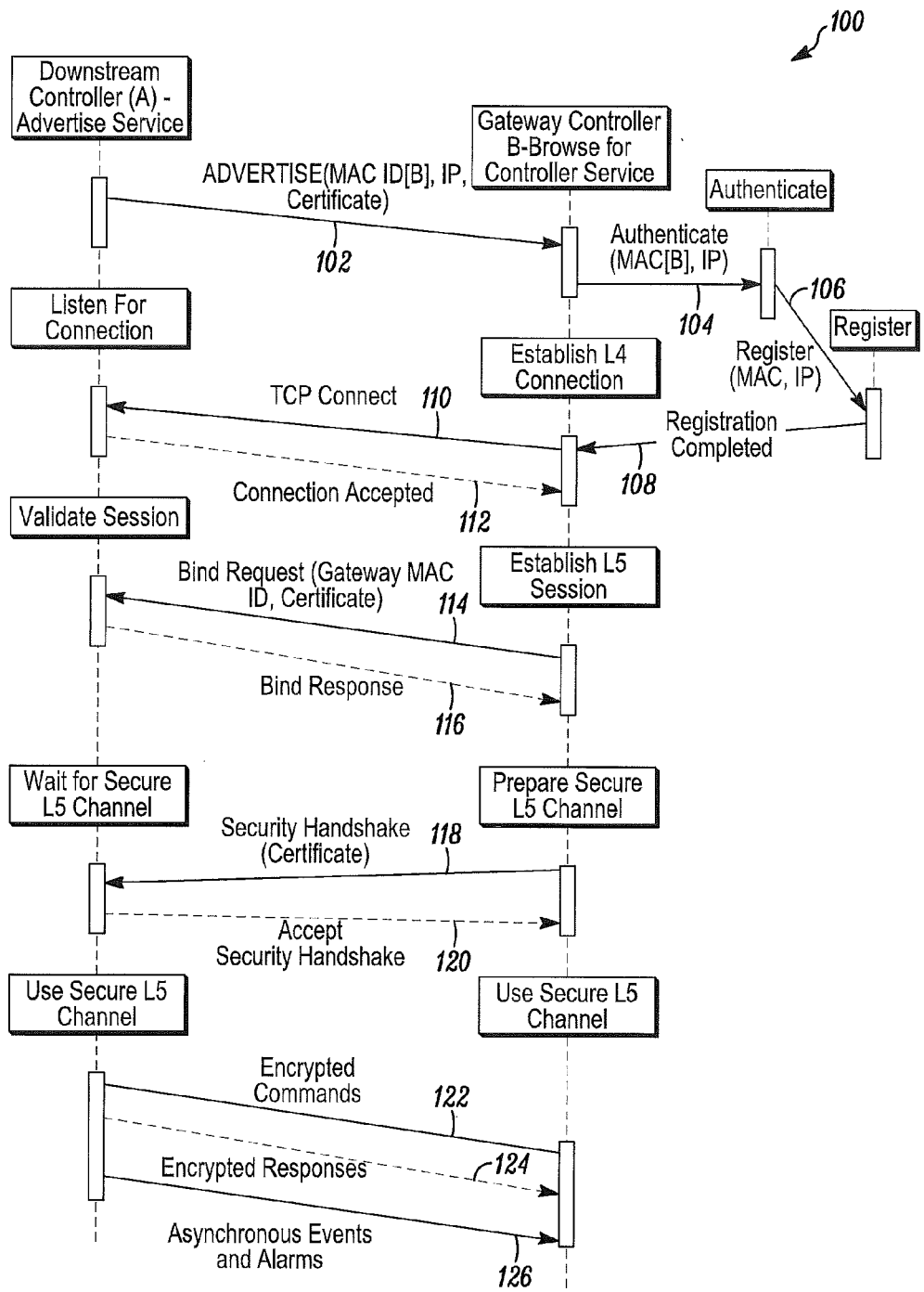
FIG. 2 is a block diagram of a set of steps that may be implemented by the system of FIG. 1.

FIG. 2 depicts a simplified flow chart 100 of registration of the sensors and the cameras with the system 10 through the gateway. In this regard, the downstream controller transmits 102 the advertisement message in response to a unicast discovery message from the gateway. The advertisement message 102 may include a MAC address of the downstream controller, an IP address, and a signed certificate. In this case, the certificate may have been signed by the downstream controller in order to authenticate the downstream controller with the gateway controller.

The advertisement message may also include one or more additional data fields. Included within the additional data fields may be an identifier of the service provided through the downstream controller (e.g., an identifier of the downstream controller as being an access controller, a camera, etc.). The data fields may also include other identifiers, including a revision number of software operating on the downstream controller, a card reader model, camera model, etc.

The gateway receives the advertisement message and authenticates 104 the downstream controller. The gateway may authenticate the downstream controller based upon prior knowledge of certificate processing and signing capabilities used by the downstream controller in signing the authentication certificate that was originally provided by the gateway.

Once the downstream controller has been authenticated, the downstream controller may be registered 106 by a registration processor into the system map table and the service status table. In addition to registering the downstream controller into the system map table, the gateway controller may also register the downstream controller with an appropriate set of alarm processing applications. For example, a downstream controller that includes a camera may be registered with one or more recording applications that record video from the camera, either continuously or only when motion is detected within a field of view of the camera.

The registration processor may also forward a registration complete message to an appropriate processor of the gateway controller. In response, the gateway controller may take steps to set up a layer 4 (L4) connection with the downstream controller. In this regard, the gateway controller may send 110 a TCP connect message to the downstream controller. The downstream controller may respond 112 with a connection accepted message.

The gateway may also take steps to set up a communication channel between the downstream controller and the gateway via a layer 5 (L5) session. The gateway may do this by sending 114 a bind request to the downstream controller. The bind request may include a MAC address of the gateway and a security certificate. The downstream controller may reject the bind request if the controller is already bound to another gateway. If not, then downstream controller may complete channel set up by returning 116 a bind response to the gateway.

The downstream controller may also save data regarding the connection in a gateway status file of memory of the downstream controller. The data may include at least an identifier of the gateway and an IP address of the gateway. The data of the gateway is saved in memory of the downstream controller in case another gateway queries the downstream controller. If so, then the downstream controller rejects a connection from the other gateway.

The gateway may also establish a secure connection with the downstream controller via the layer 5 (L5) session. In this regard, the gateway may send 118 a security handshake including a security key and encryption method (e.g., AES). Where AES is used, encryption may be performed via SSL/TLS.

The downstream controller may return 120 an accept security handshake including an acknowledgement of a security level and a method and a level of encryption. The details of the secure connection may also be saved in a connection file.

Once a secure channel has been set up between the gateway and the downstream controller, messages may be exchange as needed. In this regard, encrypted commands may be sent 122 from the gateway to the downstream controller and encrypted responses may be received 124.

Asynchronous messages may also be sent and received. For example, in the case where the downstream controller is a door switch, activation of that switch may result in an alarm message being sent 126 to the gateway.

Once the channel has been set up with the downstream controller, a user may access the corresponding sensor or camera via a user interface 38. Within a display 40 of the user interface, one or more gateways may be displayed. The user may click on one of the gateways using a mouse or keyboard 42 to see a list of discovered sensors and cameras by service group. The user may click on each of the service groups and receive a list of devices (e.g., sensors, cameras, etc.) discovered within that service group by that gateway.

Upon clicking on one of the devices, a set up processor of the panel operating through the gateway may retrieve the settings of that device. If that device is a camera, then the settings may include a frame rate of the camera, whether the camera has motion detection capability, and whether the camera has a pan-tilt-zoom (PTZ) capability. The user may adjust the settings and assign a PTZ processor to the camera in order to control the PTZ capability of the camera.

Similarly, if that device is an access controller, then the user may view the model of the card reader and adjust its capabilities. The user may also download a set of identifiers of authorized users or logically connect the card reader to a separate authorization processor.

Upon completion of the set up, the system may operate conventionally. Activation of one of the sensors by an intruder may cause a message to be sent through the channel to the alarm processor of the panel. The panel may activate a local alarm and send the alarm message to the central monitoring station 24.

The use of the gateway allows a number of wired and/or wireless downstream controllers (i.e., sensors and/or cameras) to be aggregated through a single gateway. In addition, should one gateway become disabled, the sensors and the cameras may be automatically discovered by and connections re-established through another gateway.

In one example, a gateway periodically (e.g., every 30 seconds) rediscovers the downstream controllers of the service group(s) assigned to that gateway. For each device that responds, the gateway attempts to find a MAC address of that downstream controller in its service status table. If the gateway cannot find the MAC address, then that downstream controller is a new device and will be added to the service status table. If the MAC address is found, then the gateway will compare an IP address and an identifier (host name) of that downstream controller with current content of a record in the service status table. If the IP address and/or the host name has been changed, then the record is updated.

In this regard, the availability of multiple gateways allows each of the gateways to create a distinct grouping of the downstream controllers. With multiple gateways, each of the gateways may serve as a backup for one or more other controllers.

Under some embodiments, authentication of the downstream controllers could be a manual process that involves participation by an administrator. This could be useful where a sensor or a camera of a discovered downstream controller is manually activated by the administrator to confirm a location of the discovered controller.

Under other embodiments, authentication of gateway controllers by the downstream controllers may optionally involve a third-party or other trusted party that validates an authenticity of a gateway certificate. This may be accomplished by connecting an optional processor to each of the downstream controllers, where the optional processor may include additional capabilities to process and authenticate certificates.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
a downstream controller of a security system advertising a service group of the downstream controller on a sub-network, the service group including a type of functionality provided by the downstream controller for monitoring a secured area;
the downstream controller receiving a connection request message from a first gateway controller that is part of the service group;
responsive to the connection request message, the downstream controller transmitting a connection accept message to the first gateway controller to set up a connection channel between the downstream controller and the first gateway controller; and
the downstream controller saving, in an associated memory device, data related to the connection channel or data related to the first gateway controller.

2. The method of claim 1 further comprising the downstream controller advertising the service group of the downstream controller responsive to receiving a multicast message from the first gateway controller identifying the service group.

3. The method of claim 1 further comprising the downstream controller receiving a bind request message from the first gateway controller.

4. The method of claim 3 further comprising, responsive to the bind request message, the downstream controller transmitting a bind accept message to the first gateway controller to set up a communication channel between the first gateway controller and the downstream controller.

5. The method of claim 3 further comprising the downstream controller rejecting the bind request message when the downstream controller is bound to a second gateway controller.

6. The method of claim 1 further comprising:
the downstream controller receiving a security handshake request message from the first gateway controller; and
responsive to the security handshake request message, the downstream controller transmitting a security handshake accept message to the first gateway controller to secure the connection channel between the gateway controller and the first downstream controller.

7. A method comprising:
a gateway controller of a security system receiving an advertisement message from a downstream controller on a sub-network, the advertisement message advertising a service group of the downstream controller, the service group including a type of functionality provided by the downstream controller for monitoring a secured area;
responsive to receiving the advertisement message, the gateway controller transmitting a connection request message to the downstream controller when the gateway controller is part of the service group, the connection request message including data related to identifying characteristics of the gateway controller for storage in an associated memory device of the downstream controller; and
the gateway controller receiving a connection accept message from the downstream controller to set up a connection channel between the gateway controller and the downstream controller.

8. The method of claim 7 further comprising the gateway controller transmitting a multicast message to the downstream controller identifying the service group prior to receiving the advertisement message from the downstream controller.

9. The method of claim 7 further comprising the gateway controller transmitting a bind request message to the downstream controller.

10. The method of claim 9 further comprising the gateway controller receiving a bind accept message from the downstream controller to set up a communication channel between the gateway controller and the downstream controller.

11. The method of claim 9 further comprising the gateway controller receiving a bind reject message from the downstream controller.

12. The method of claim 7 further comprising:
the gateway controller transmitting a security handshake request message to the downstream controller; and
the gateway controller receiving a security handshake accept message from the downstream controller to secure the connection channel between the gateway controller and the downstream controller.

13. The method of claim 7 further comprising the gateway controller saving, in an associated memory device, data related to identifying characteristics of the downstream controller.

14. The method of claim 7 further comprising, responsive to the advertisement message, the gateway controller authenticating the downstream controller prior to transmitting the connection request message to the downstream controller.

15. The method of claim 14 further comprising the gateway controller registering the downstream controller after authenticating the downstream controller.

16. An apparatus comprising:
a transceiver; and
a programmable processor,
wherein the transceiver receives an advertisement message from a downstream controller on a sub-network, the advertisement message advertising a service group of the downstream controller, the service group including a type of functionality provided by the downstream controller for monitoring a secured area,
wherein, responsive to receiving the advertisement message, the programmable processor causes the transceiver to transmit a connection request message to the downstream controller when the programmable processor is part of the service group,
wherein the connection request message includes data related to identifying characteristics of the programmable processor for storage in an associated memory device of the downstream controller, and
wherein the transceiver receives a connection accept message from the downstream controller to set up a connection channel between the transceiver and the downstream controller.

17. The apparatus as in claim 16 wherein the programmable processor causes the transceiver to transmit a multicast message to the downstream controller identifying the service group prior to the transceiver receiving the advertisement message from the downstream controller.

18. The apparatus as in claim 16 further comprising a memory device for saving data related to identifying characteristics of the downstream controller.

19. The apparatus as in claim 16 wherein, responsive to the advertisement message, the programmable processor authenticates and registers the downstream controller prior to causing the transceiver to transmit the connection request message.

* * * * *